(12) United States Patent
Osawa et al.

(10) Patent No.: US 10,654,512 B2
(45) Date of Patent: May 19, 2020

(54) STEERING DEVICE

(71) Applicants: YAMADA MANUFACTURING CO., LTD., Kiryu-shi, Gunma (JP); HONDA MOTOR CO., LTD., Tokyo (JP)

(72) Inventors: Toshihito Osawa, Kiryu (JP); Minoru Takakusaki, Kiryu (JP); Eric M. Heitkamp, Dublin, OH (US); Robert A. Salemme, Columbus, OH (US); Cameron R. Titus, Marysville, OH (US); Joshua D. Pritchard, Columbus, OH (US); Toshihiro Nakamura, Dublin, OH (US)

(73) Assignees: YAMADA MANUFACTURING CO., LTD., Kiryu-Shi (JP); HONDA MOTOR CO., LTD., Tokyo (JP)

( * ) Notice: Subject to any disclaimer, the term of this patent is extended or adjusted under 35 U.S.C. 154(b) by 239 days.

(21) Appl. No.: 15/450,171

(22) Filed: Mar. 6, 2017

(65) Prior Publication Data
US 2018/0251148 A1 Sep. 6, 2018

(51) Int. Cl.
*B62D 1/184* (2006.01)
*B62D 1/185* (2006.01)
*B62D 1/19* (2006.01)

(52) U.S. Cl.
CPC ............ *B62D 1/184* (2013.01); *B62D 1/195* (2013.01)

(58) Field of Classification Search
CPC .................................. B62D 1/184; B62D 1/185
See application file for complete search history.

(56) References Cited

U.S. PATENT DOCUMENTS

| 2005/0050978 | A1* | 3/2005 | Lee | B62D 1/184 74/493 |
| 2015/0059512 | A1* | 3/2015 | Kawakami | B62D 1/184 74/493 |
| 2015/0232116 | A1* | 8/2015 | Yokota | B62D 1/192 74/493 |
| 2015/0266497 | A1* | 9/2015 | Yoshihara | B62D 1/184 74/493 |
| 2016/0059879 | A1* | 3/2016 | Tagaya | B62D 1/184 74/493 |
| 2016/0214639 | A1* | 7/2016 | Yokota | B62D 1/185 |
| 2016/0280248 | A1* | 9/2016 | Uesaka | B62D 1/195 |
| 2017/0043803 | A1* | 2/2017 | Yamamoto | B62D 1/192 |

(Continued)

FOREIGN PATENT DOCUMENTS

JP 2004-009837 1/2004

*Primary Examiner* — Barry Gooden, Jr.
(74) *Attorney, Agent, or Firm* — Rankin, Hill & Clark LLP

(57) ABSTRACT

A steering device includes an inner column and an outer column which has a guide cylinder portion supporting the inner column to be movable in an axial direction and a holding cylinder portion located at a rear side in the axial direction in relation to the guide cylinder portion and having a slit extending in the axial direction. The guide cylinder portion has a support face which slidably supports an outer circumferential face of the inner column and a regulation face which is located at a front side in the axial direction in relation to the support face and regulates a movement of the inner column in a radial direction. The guide cylinder portion is formed so that a distance from an axis to the regulation face in the radial direction is longer than a distance from the axis to the support face.

4 Claims, 9 Drawing Sheets

(56) References Cited

U.S. PATENT DOCUMENTS

| | | | |
|---|---|---|---|
| 2017/0297607 A1* | 10/2017 | Orihara | B62D 1/184 |
| 2017/0313344 A1* | 11/2017 | Yoshimura | B62D 1/184 |
| 2017/0361864 A1* | 12/2017 | Takahashi | B62D 1/185 |
| 2018/0001845 A1* | 1/2018 | Orihara | B60R 16/027 |
| 2018/0029627 A1* | 2/2018 | Sugishita | B62D 1/184 |
| 2018/0057036 A1* | 3/2018 | Kim | B62D 1/184 |
| 2018/0057037 A1* | 3/2018 | Abe | B62D 1/184 |
| 2018/0099688 A1* | 4/2018 | Ito | B62D 1/192 |
| 2018/0346011 A1* | 12/2018 | Hagiwara | B62D 1/184 |
| 2019/0152507 A1* | 5/2019 | Shiroishi | B62D 1/184 |

* cited by examiner

STEERING DEVICE

BACKGROUND

Field

The present disclosure relates to a steering device.

Description of Related Art

Among steering devices, there is known a steering device having a telescopic function of adjusting a longitudinal position of a steering wheel in response to differences in physique or driving posture of a driver. The steering device includes an inner column and an outer column into which the inner column is inserted. The inner column rotatably supports a steering shaft equipped with a steering wheel. The outer column is attached to a vehicle body through a bracket and supports the inner column and the steering shaft to be movable in an axial direction (a longitudinal direction).

Incidentally, in the steering device having the telescopic function, the inner column and the steering shaft move in the axial direction along with the steering wheel when a predetermined load is applied to the steering wheel in the event of a secondary collision. According to this configuration, an impact load which is applied to a driver in the event of a secondary collision is reduced due to a sliding resistance generated between the outer column and the inner column.

SUMMARY

In the steering device, there has been a desire for further improving an impact absorption capacity in the event of a secondary collision by ensuring a movement amount of the inner column in the axial direction relative to the outer column. However, in the steering device, when a collision load input direction intersects the axial direction of the inner column, a component force of a collision load acts in a radial direction orthogonal to the axial direction. Then, the inner column rotates in the radial direction and presses against the outer column such that friction between the two columns prevents movement of the inner column with respect to the outer column. For that reason, in the conventional steering device, there is room for improvement in that the movement amount of the inner column in the axial direction needs to be ensured.

Aspects of the present invention are made in view of the above-described circumstances and an object of the present invention is to provide a steering device capable of further improving an impact absorption capacity in the event of a secondary collision.

In order to solve the above-described problems, the present invention employs the following aspects.

(1) A steering device according to an aspect of the present invention includes: an inner member that extends along an axis and has a steering wheel attached to a first end side in an axial direction; an outer member that includes a guide portion supporting the inner member to be movable in the axial direction and a holding portion located at the first end side in the axial direction in relation to the guide portion and having a slit extending in the axial direction; and a telescopic adjustment mechanism configured to switch a locked state where a gap of the slit is contracted so that a movement of the inner member relative to the outer member is regulated by the holding portion and a lock released state where the gap of the slit is expanded so that the movement of the inner member relative to the outer member is allowed, wherein the guide portion includes a support face which slidably supports an outer circumferential face of the inner member and a regulation face which is located at a second end side in the axial direction in relation to the support face, the guide portion being formed so that a distance from the axis to the regulation face in the radial direction is longer than a distance from the axis to the support face.

According to the above aspect (1), the inner member moves in the axial direction relative to the outer member while sliding on the support face. For that reason, the inner member can be smoothly guided relative to the outer member when a telescopic operation is performed or a collision load is input.

Particularly, in the present aspect, since the regulation face is provided at the second end side in relation to the support face of the guide portion, the inner member contacts the regulation face when the inner member is inclined in the radial direction due to a collision load so that an inclination of the inner member in the radial direction is regulated. Accordingly, the above-described twisting can be suppressed. For that reason, since the inner member can be smoothly moved in the axial direction in the event of a secondary collision, it is possible to ensure a desired movement amount in the axial direction in the event of the secondary collision. As a result, it is possible to further improve an impact absorption capacity in the event of a secondary collision.

Further, in the present aspect, a distance from the axis to the regulation face is longer than a distance from the axis to the support face. For that reason, when the inner member moves only in the axial direction relative to the outer member, the outer circumferential face of the inner member does not contact the regulation face. Accordingly, it is possible to suppress an excessive sliding resistance between the outer circumferential face of the inner member and the inner circumferential face of the guide cylinder portion.

Further, when an area ratio between the support face and the regulation face is changed, a sliding resistance between the outer member and the inner member can be changed. For example, when a contact area between the inner member and the support face is increased, a sliding resistance between the inner member and the support face increases. In this case, for example, a collision load absorbing amount can be increased.

In contrast, when the contact area between the inner member and the support face is decreased (the regulation face is widened), the sliding resistance between the inner member and the support face decreases. In this case, it is possible to reduce, for example, a collision load absorption amount. In this way, the collision load absorption amount (sliding resistance) can be changed in accordance with a change in area ratio between the support face and the regulation face. For this reason, even when a required impact load absorption amount is different, it is possible to obtain a desired impact absorption capacity without significant design change. Further, it is possible to reduce the volume of the outer column and to reduce the weight by reducing the contact area between the inner column and the support face.

(2) In the above aspect (1), the guide portion may include a small diameter portion which is formed in a cylindrical shape and of which an inner circumferential face is configured by the support face and a large diameter portion which is formed in a cylindrical shape and of which an inner circumferential face is configured by the regulation face.

According to the above aspect (2), since an entire circumference of the inner member can be surrounded by the support face and the regulation face, the above-described twisting can be reliably suppressed.

(3) In the above aspect (1) or (2), a part located at the second end side in the axial direction of the guide portion of the outer member may be provided with a punched portion penetrating the outer member in the radial direction.

According to the above aspect (3), since the punched portion is formed at the second end side of the guide portion in the axial direction (a part located at the opposite side to the slit in the axial direction with the guide portion interposed therebetween), the above-described twisting can be suppressed and a further decrease in weight of the outer member can be realized.

According to the aspects of the present invention, it is possible to further improve an impact absorption capacity in the event of a secondary collision.

DETAILED DESCRIPTION OF THE INVENTION

Next, an embodiment of the present invention will be described with reference to the drawings.

[Steering Device]

Figure 1:
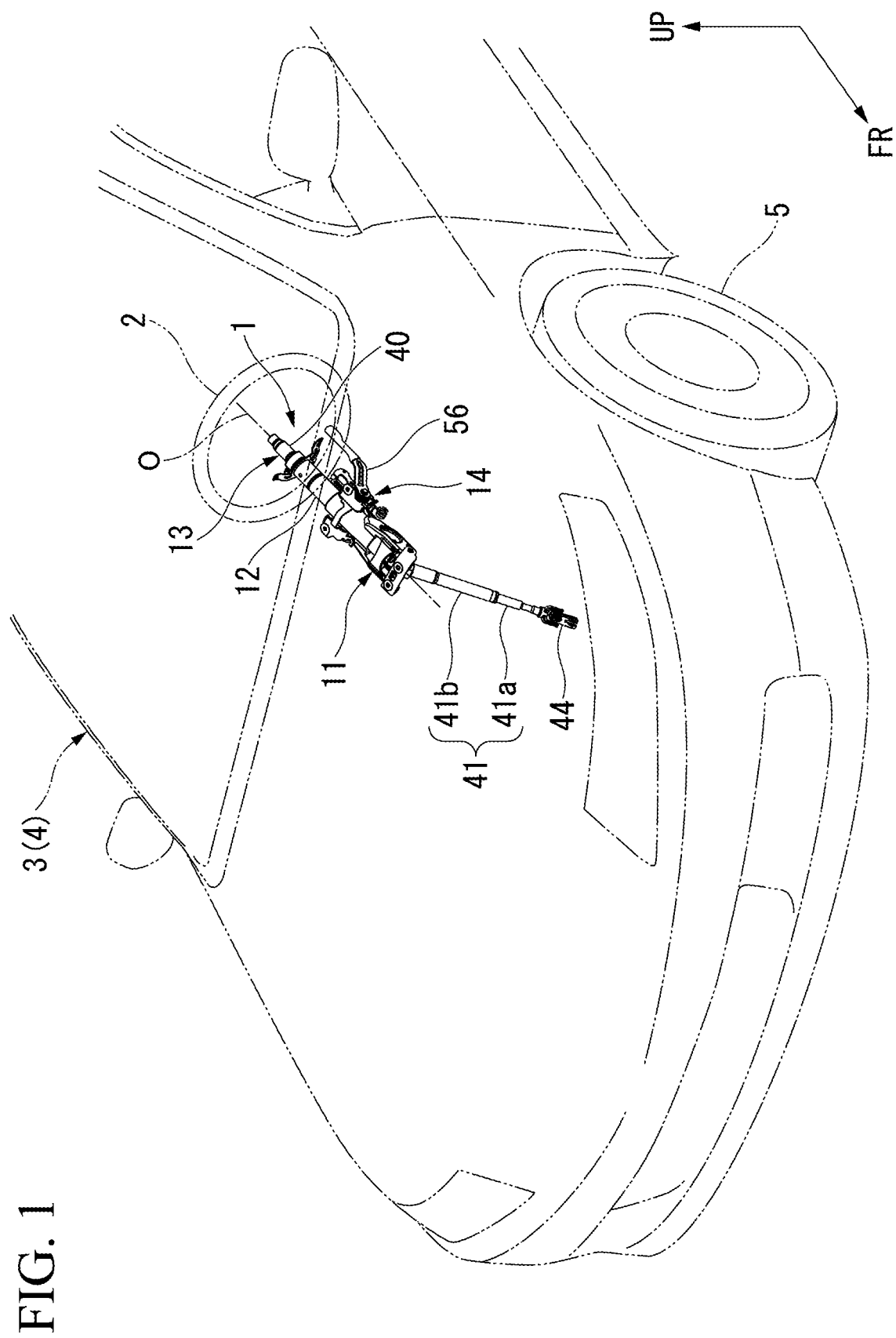
FIG. 1 is a perspective view of a vehicle equipped with a steering device according to an embodiment.

FIG. 1 is a perspective view of a vehicle 3 equipped with a steering device 1.

As shown in FIG. 1, the steering device 1 is mounted on the vehicle 3. The steering device 1 adjusts a steering angle of a vehicle wheel 5 in accordance with an operation of rotating a steering wheel 2. Additionally, a longitudinal direction, a vertical direction, and a horizontal direction in the following description are the same as directions in the vehicle 3 unless otherwise specified. In the drawings, an arrow UP indicates an upside and an arrow FR indicates a front side.

Figure 2:
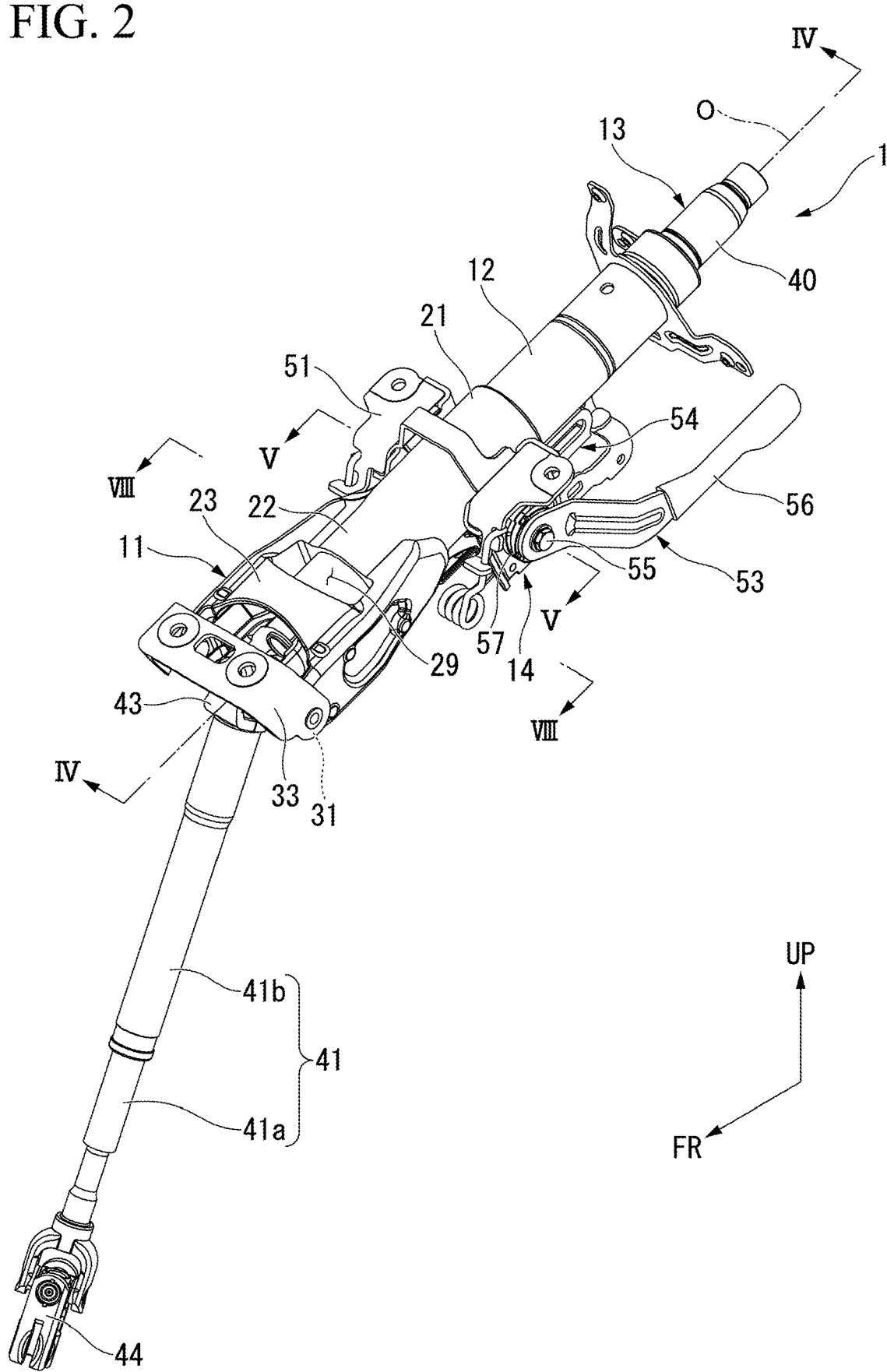
FIG. 2 is a perspective view of the steering device according to the embodiment.

FIG. 2 is a perspective view of the steering device 1.

As shown in FIG. 2, the steering device 1 mainly includes an outer column (an outer member) 11, an inner column (an inner member) 12, a steering shaft (an inner member) 13, and a telescopic adjustment mechanism 14. In the steering device 1 of the embodiment, axes O of the inner column 12 and the steering shaft 13 (a rear shaft 40 to be described later) are coaxially disposed. In the following description, a direction in which the axes O of the inner column 12 and the steering shaft 13 extend will be simply referred to as an axial direction, a direction which is orthogonal to the axis O will be referred to as a radial direction, and a direction about the axis O will be referred to as a circumferential direction.

The steering device 1 of the embodiment is disposed so that the axis O intersects the longitudinal direction. Specifically, the axis O of the steering device 1 extends upward as it goes backward. Here, for convenience in the following description, a side toward the steering wheel 2 of the steering device 1 in the axial direction will be referred to as a rear side (a first end side) and a side toward an opposite side to the steering wheel 2 will be referred to as a front side (a second end side). Further, in the radial direction, a direction in the vertical direction of the vehicle will be referred to as the vertical direction and a direction following the width direction of the vehicle will be referred to as the horizontal direction.

<Outer Column>

The outer column 11 is formed in a cylindrical shape in which a diameter of a front part is larger than that of a rear part. The inner column 12 is inserted into the outer column 11. The outer column 11 supports the inner column 12 so that the inner column is movable in the axial direction. Specifically, the outer column 11 is formed such that a holding cylinder portion (a holding portion) 21, a guide cylinder portion (a guide portion) 22, and a large diameter cylinder portion 23 are connected to one another from the rear side toward the front side.

Figure 3:
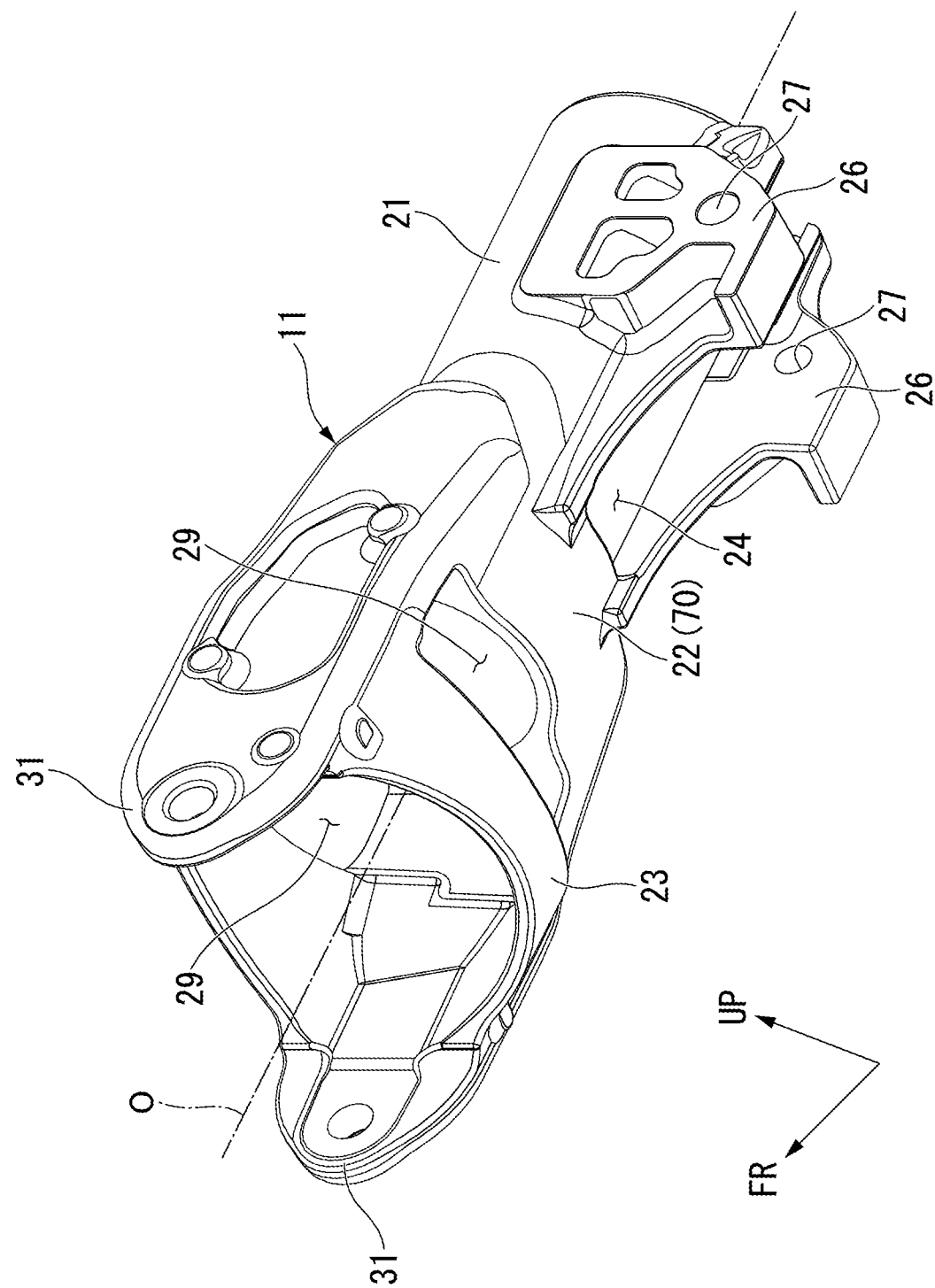
FIG. 3 is a perspective view of an outer column.

FIG. 3 is a perspective view of the outer column 11. The outer column 11 is fixed to a vehicle body 4 (see FIG. 1) by a rear bracket 51 described later.

As shown in FIG. 3, the holding cylinder portion 21 is formed in a cylindrical shape and is disposed to be coaxial to the axis O. That is, a curvature radius of an inner circumferential face of the holding cylinder portion 21 is uniform in an entire circumference about the axis O. A slit 24 is formed at a part of the holding cylinder portion 21 in the circumferential direction (in the embodiment, a lower part of the holding cylinder portion 21). The slit 24 penetrates the holding cylinder portion 21 in the radial direction (the vertical direction) and extends in the axial direction. The slit 24 is formed in an entire part of the holding cylinder portion 21 in the axial direction.

In the holding cylinder portion 21, clamping portions 26 are respectively formed at opposite portions interposing the slit 24 in the horizontal direction. The clamping portions 26 are integrally formed with the holding cylinder portion 21. The clamping portions 26 are formed to extend downward from the holding cylinder portion 21. Each clamping portion 26 is provided with a penetration hole 27 which penetrates the clamping portion 26 in the horizontal direction.

The guide cylinder portion 22 is provided to extend forward in the axial direction from a rear edge of the holding cylinder portion 21. The guide cylinder portion 22 supports the inner column 12 so that the inner column is slidable in the axial direction. Additionally, a detailed description of the guide cylinder portion 22 will be presented below.

Figure 4:
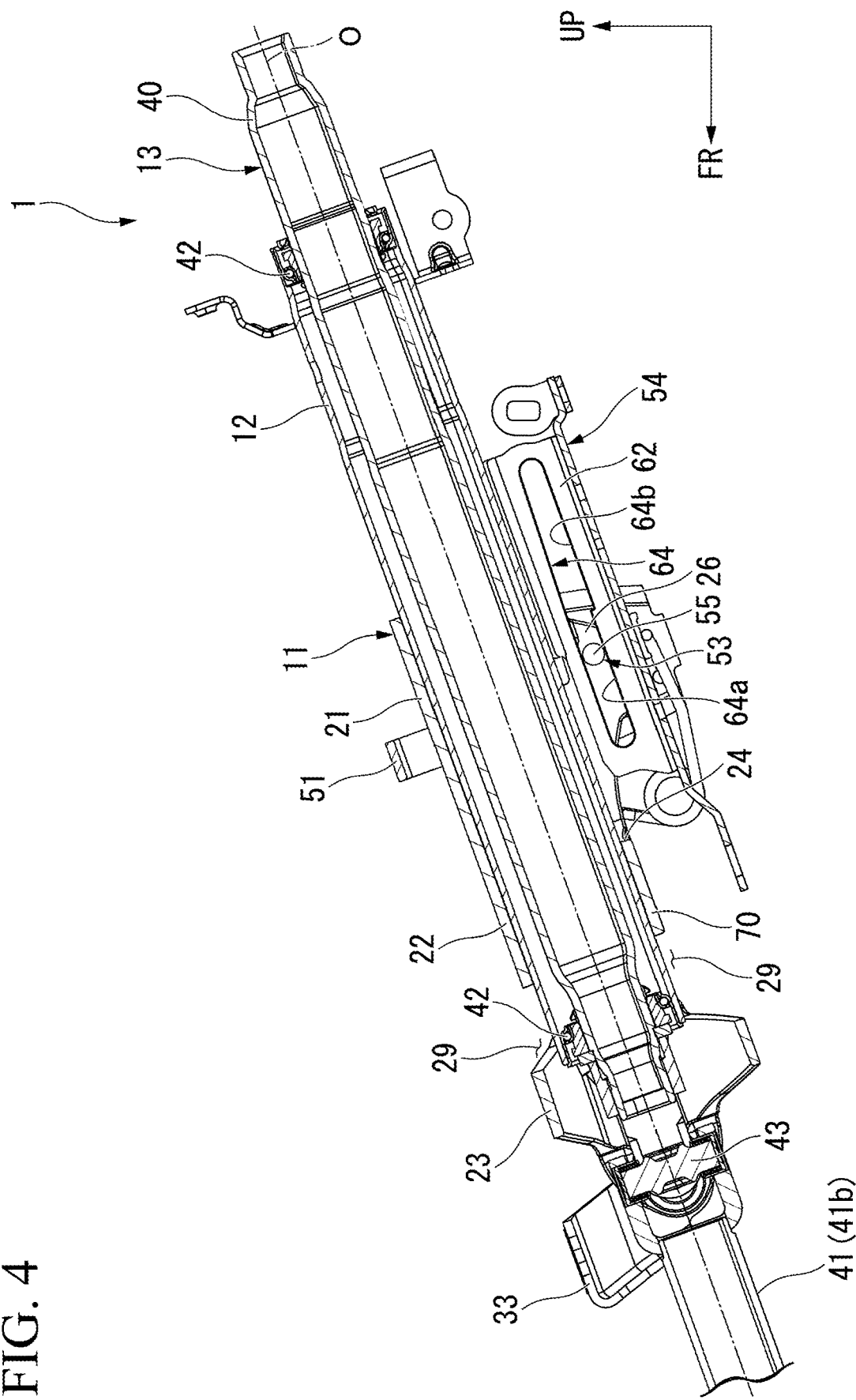
FIG. 4 is a cross-sectional view taken along a line IV-IV of FIG. 2.

FIG. 4 is a cross-sectional view taken along a line IV-IV of FIG. 2.

As shown in FIGS. 3 and 4, the large diameter cylinder portion 23 is provided to extend backward in the axial direction from a rear edge of the guide cylinder portion 22. The large diameter cylinder portion 23 is formed in, for example, a flat circular shape in the vertical direction in a front view from the axial direction. A distance between the axis O and an inner circumferential face of the large diameter cylinder portion 23 in the radial direction is set to a length in which an outer circumferential face of the inner column 12 does not contact the inner circumferential face of the large diameter cylinder portion 23 in an entire circumference.

Opposite portions of the large diameter cylinder portion 23 in the vertical direction are respectively provided with punched portions 29 which penetrate the large diameter cylinder portion 23 in the vertical direction. Each punched portion 29 is formed in a rectangular shape in a top view when viewed in the vertical direction. Additionally, the outer column 11 may not include the punched portion 29. Further, a position, a shape, or a size of the punched portion 29 can be appropriately changed.

Opposite portions of a front edge of the large diameter cylinder portion 23 in the horizontal direction are respectively provided with connection protrusion portions 31 which protrude forward in the axial direction. Each connection protrusion portion 31 is integrally formed with the large diameter cylinder portion 23. As shown in FIG. 2, a front bracket 33 is connected to the connection protrusion portion 31. The front bracket 33 is used to fix the outer column 11 (the steering device 1) to the vehicle body 4 (see FIG. 1) through the connection protrusion portion 31.

<Inner Column>

As shown in FIG. 4, the inner column 12 is formed in a cylindrical shape extending in the axial direction. An outer diameter of the inner column 12 is slightly smaller than an inner diameter of the holding cylinder portion 21 or the guide cylinder portion 22. The inner column 12 is inserted into the outer column 11. The inner column 12 is supported by the holding cylinder portion 21 or the guide cylinder portion 22 to be slidable on the inner circumferential face of the holding cylinder portion 21 or the guide cylinder portion 22. In an example of FIG. 4, a length of the inner column 12 in the axial direction is longer than a length of the outer column 11 in the axial direction.

<Steering Shaft>

The steering shaft 13 includes the rear shaft 40 and a front shaft 41 (see FIG. 2). The rear shaft 40 is supported inside the inner column 12 to be rotatable about the axis O through a bearing 42. A rear end of the rear shaft 40 protrudes backward in the axial direction in relation to a rear end of the inner column 12. The steering wheel 2 (see FIG. 1) is connected to the rear end of the rear shaft 40.

The front shaft 41 is connected to a front end of the rear shaft 40 through a first universal joint 43. The front shaft 41 is movable in a telescopic manner in the extension direction of the front shaft 41. As shown in FIG. 2, the front shaft 41 includes a multi-stage shaft (an inner shaft 41a and an outer shaft 41b). The front shaft 41 moves in a telescopic manner while the inner shaft 41a moves forward and backward relative to the outer shaft 41b. Additionally, in the embodiment, for example, a male spline formed at a rear end of the inner shaft 41a engages with a female spline formed inside the outer shaft 41b. Accordingly, a relative rotation between the shafts 41a and 41b is regulated and a forward/backward movement of each of the shafts 41a and 41b is allowed. Here, a telescopic structure of the front shaft 41 can be appropriately changed.

As shown in FIG. 1, a second universal joint 44 is connected to a front end of the front shaft 41. The second universal joint 44 is connected to an input shaft of a steering gear box (not shown). When a rotation force of the steering shaft 13 of the steering device 1 is transmitted to the steering gear box, the vehicle wheel 5 is steered.

<Telescopic Adjustment Mechanism>

As shown in FIG. 2, the telescopic adjustment mechanism 14 is used to switch a locked state where a movement of the inner column 12 (and the steering shaft 13) in the longitudinal direction relative to the outer column 11 is regulated and a lock released state where the movement in the longitudinal direction is allowed. Specifically, the telescopic adjustment mechanism 14 includes the rear bracket 51, an operation mechanism 53, and a guide rail 54.

Figure 5:
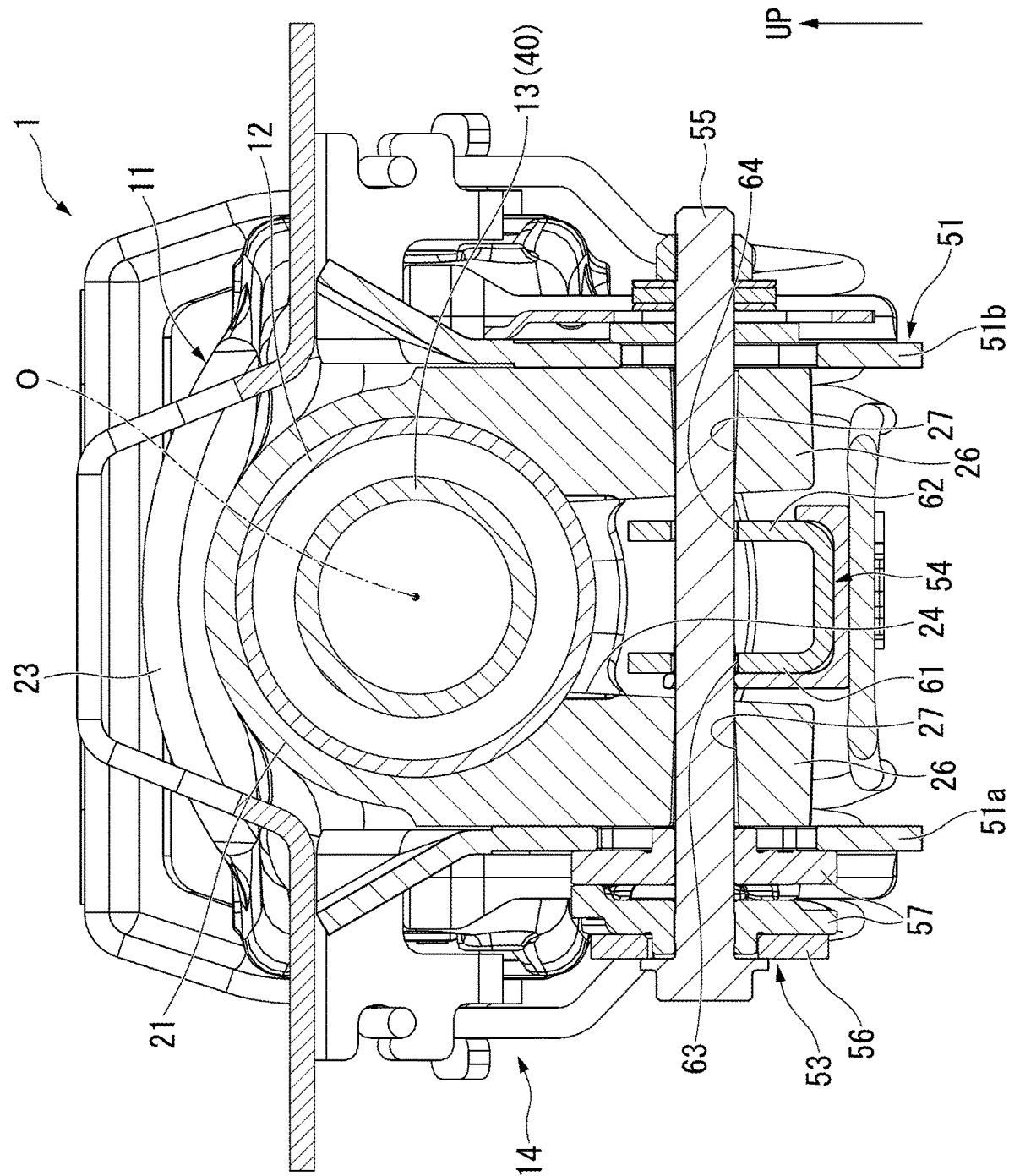
FIG. 5 is a cross-sectional view taken along a line V-V of FIG. 2.

FIG. 5 is a cross-sectional view taken along a line V-V of FIG. 2.

The rear bracket 51 is disposed at a position equivalent to the clamping portion 26 (see FIG. 3) in the axial direction. The rear bracket 51 is formed to surround both left and right parts and an upper part of the outer column 11. The rear bracket 51 has side plate portions 51a and 51b on both left and right sides. The side plate portions 51a and 51b sandwich the outer column 11 from both the left and right sides. The rear bracket 51 fixes the steering device 1 to the vehicle body 4 (see FIG. 1) through the outer column 11.

As shown in FIGS. 2 and 5, the operation mechanism 53 includes a rotation shaft 55, an operation lever 56, and a clamping cam 57. The rotation shaft 55 is provided to be inserted into the penetration hole 27 of each clamping portion 26 and to penetrate the rear bracket 51 in the horizontal direction.

As shown in FIG. 2, the operation lever 56 is connected to a first end (in FIG. 2, a left end) of the rotation shaft 55 in the horizontal direction. The operation lever 56 is rotatable about the rotation shaft 55.

As shown in FIG. 5, the clamping cam 57 is sandwiched between the operation lever 56 and the side plate portion 51a of the rear bracket 51. The clamping cam 57 is formed so that a thickness in the horizontal direction changes in accordance with a rotation operation of the operation lever 56. In the steering device 1, since the thickness of the clamping cam 57 changes, the clamping portions 26 move close to and away from each other in the horizontal direction (a width of the slit 24 in the horizontal direction increases and decreases) through the side plate portions 51a and 51b. Specifically, when the operation lever 56 is rotated so that the thickness of the clamping cam 57 increases, the clamping portions 26 move close to each other along with the side plate portions 51a and 51b so that the holding cylinder portion 21 decreases in diameter. Accordingly, the inner column 12 is clamped by the holding cylinder portion 21 so that a movement of the inner column 12 in the longitudinal direction relative to the outer column 11 is regulated (a locked state). In contrast, when the operation lever 56 is rotated so that the thickness of the clamping cam 57 decreases in the locked state, the clamping portions 26 move away from each other along with the side plate portions 51a and 51b so that the holding cylinder portion 21 increases in diameter. Accordingly, an operation of clamping the inner column 12 by the holding cylinder portion 21 is released so that a movement of the inner column 12 in the longitudinal direction relative to the outer column 11 is allowed (a lock released state).

The guide rail 54 is fixed to a lower part of the inner column 12. The guide rail 54 passes through the slit 24 of the outer column 11 to protrude downward and is disposed between the clamping portions 26. The guide rail 54 includes a pair of opposite wall portions (a first opposite wall portion 61 and a second opposite wall portion 62) which faces each other in the horizontal direction. Additionally, the opposite wall portions 61 and 62 and the clamping portions 26 are separated from each other in the horizontal direction even when the steering device 1 is in the locked state.

The first opposite wall portion 61 is provided with a first guide hole 63 which penetrates the first opposite wall portion 61 in the horizontal direction. The second opposite wall portion 62 is provided with a second guide hole 64 which penetrates the second opposite wall portion 62 in the horizontal direction. Each of the guide holes 63 and 64 is an elongated hole extending in the axial direction. The rotation shaft 55 is inserted into each of the guide holes 63 and 64 to be movable in the axial direction relative to the guide rail 54.

Figure 6:
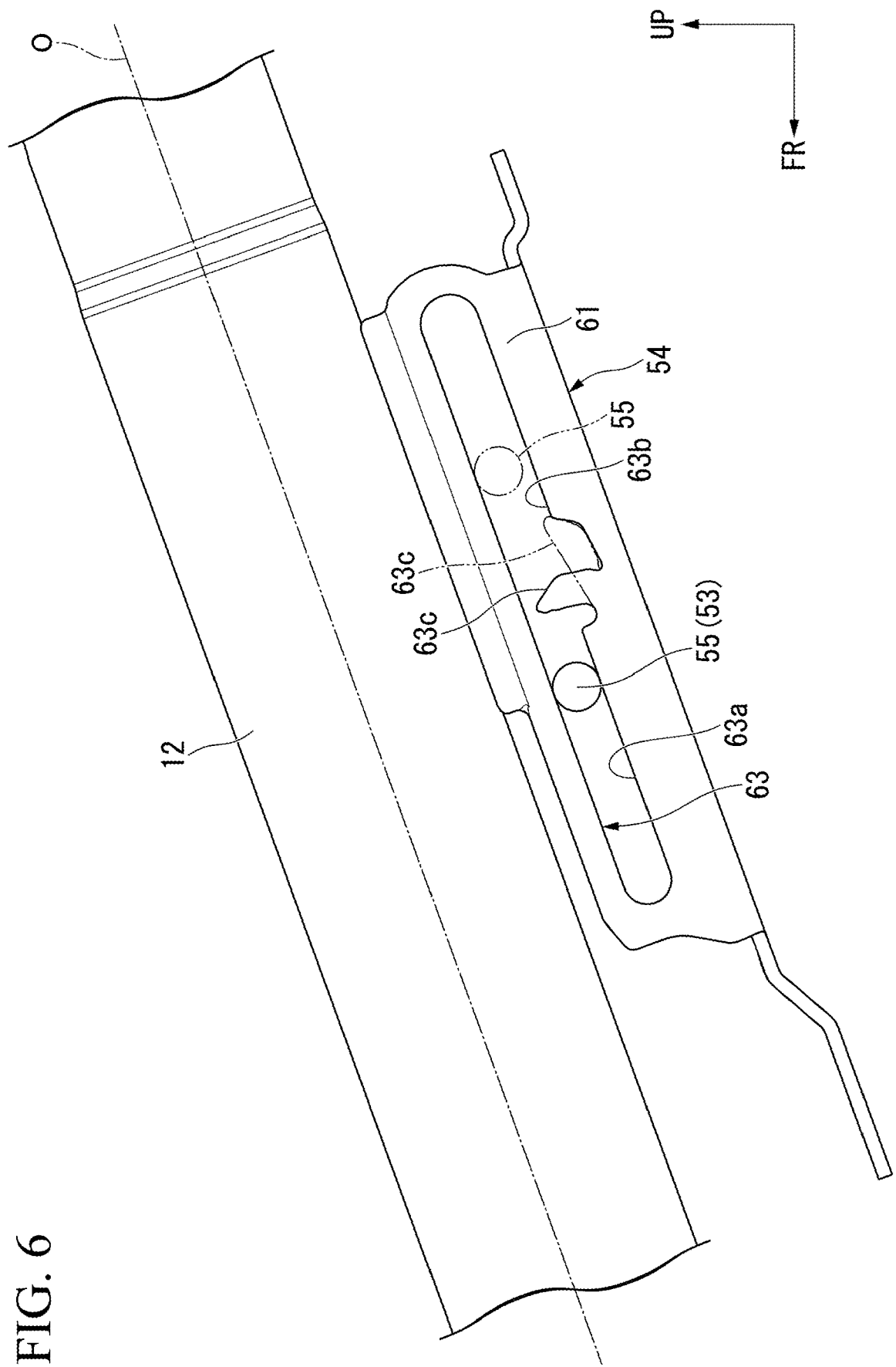
FIG. 6 is a side view showing a guide rail when viewed from a left side.

FIG. 6 is a side view showing the guide rail 54 when viewed from a left side.

As shown in FIG. 6, the first guide hole 63 includes a telescopic area 63a and a load absorbing area 63b which is connected to the telescopic area 63a at the rear side in the axial direction.

The telescopic area 63a is formed so that a width is uniform in the vertical direction. The rotation shaft 55 moves inside the telescopic area 63a in the axial direction relative to the inner column 12 in accordance with a movement of the inner column 12 relative to the outer column 11.

At a lower edge of the guide hole 63, a boundary portion between the telescopic area 63a and the load absorbing area 63b is provided with a protrusion piece 63c. The protrusion piece 63c is located on a movement track of the rotation shaft 55 in the axial direction. In the telescopic adjustment (the longitudinal position adjustment), the protrusion piece 63c is configured to regulate a telescopic adjustment range by the rotation shaft 55 abutting on the protrusion piece 63c. Further, the protrusion piece 63c is formed to fall backward about a lower end serving as a support point, for example, when an impact generated in the event of a secondary collision is transmitted to the protrusion piece through the rotation shaft 55. That is, the load absorbing area 63b reduces an impact load generated in the event of a secondary collision in such a manner that the protrusion piece 63c falls down in accordance with a backward movement of the rotation shaft 55 relative to the guide rail 54. Additionally, the protrusion piece 63c may protrude downward from an upper edge of the load absorbing area 63b. Further, a protrusion amount of the protrusion piece 63c or a width thereof in the axial direction can be appropriately changed.

Figure 7:
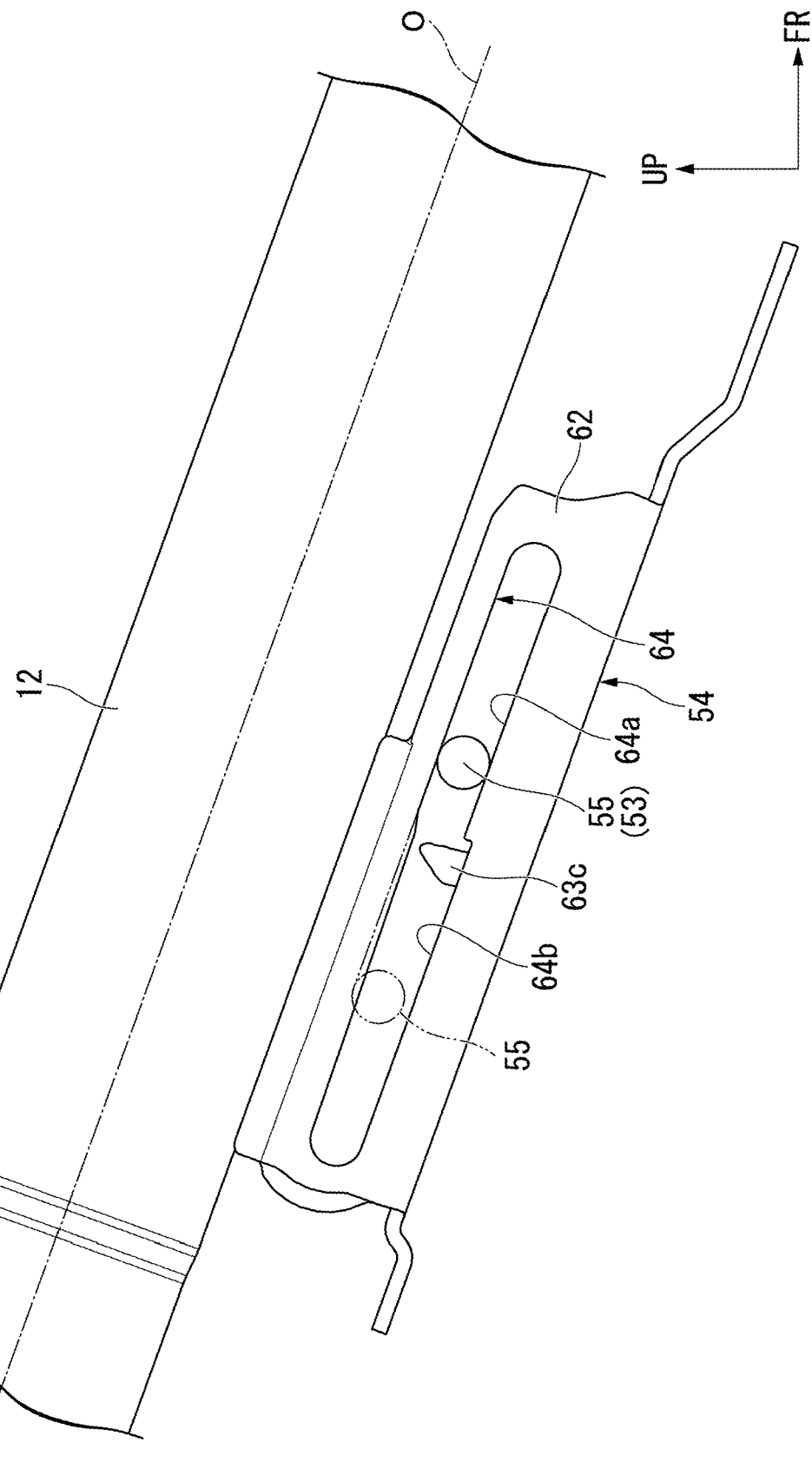
FIG. 7 is a side view showing the guide rail when viewed from a right side.

FIG. 7 is a side view showing the guide rail 54 when viewed from a right side.

As shown in FIG. 7, the second guide hole 64 includes a telescopic area 64a and a load absorbing area 64b which is continuous to the telescopic area 64a at the rear side in the axial direction.

The telescopic area 64a has the same configuration as that of the telescopic area 63a of the first guide hole 63.

An upper edge of the load absorbing area 64b gradually extends downward from an upper edge of the telescopic area 64a as it goes backward. A lower edge of the load absorbing area 64b is lowered by one step from a lower edge of the telescopic area 64a and extends backward in the axial direction. In the load absorbing area 64b, since the upper edge of the load absorbing area 64b is deformed (crushed) in accordance with the backward movement of the rotation shaft 55 relative to the guide rail 54, an impact load generated in the event of a secondary collision is reduced.

Additionally, in the embodiment, the load absorbing areas 63b and 64b of the guide holes 63 and 64 are formed in different shapes, but the load absorbing areas 63b and 64b may have the same shape. Further, the shapes of the load absorbing areas 63b and 64b can be appropriately changed as long as an impact generated in the event of a secondary collision can be absorbed. For example, the vertical widths of the load absorbing areas 63b and 64b may be set to be shorter than the diameter of the rotation shaft 55 so that the load absorbing areas 63b and 64b are pressed and widened in accordance with the movement of the rotation shaft 55. Further, the protrusion piece 63c may be respectively formed in the guide holes 63 and 64.

<Guide Cylinder Portion>

Figure 8:
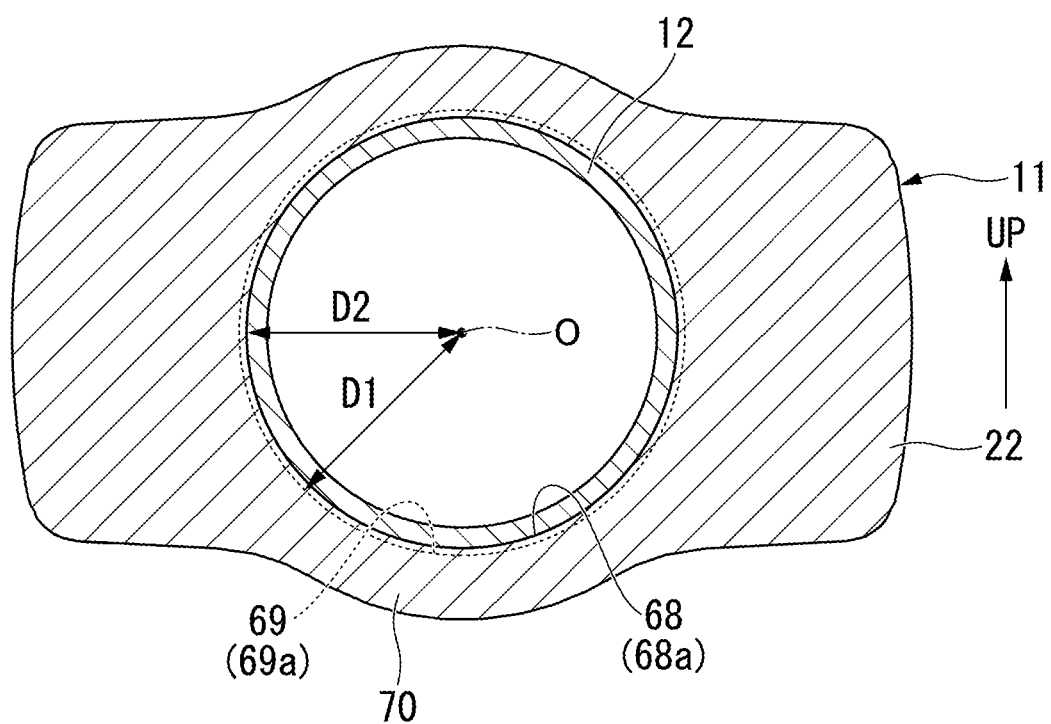
FIG. 8 is a cross-sectional view taken along a line VIII-VIII of FIG. 2.
Figure 9:
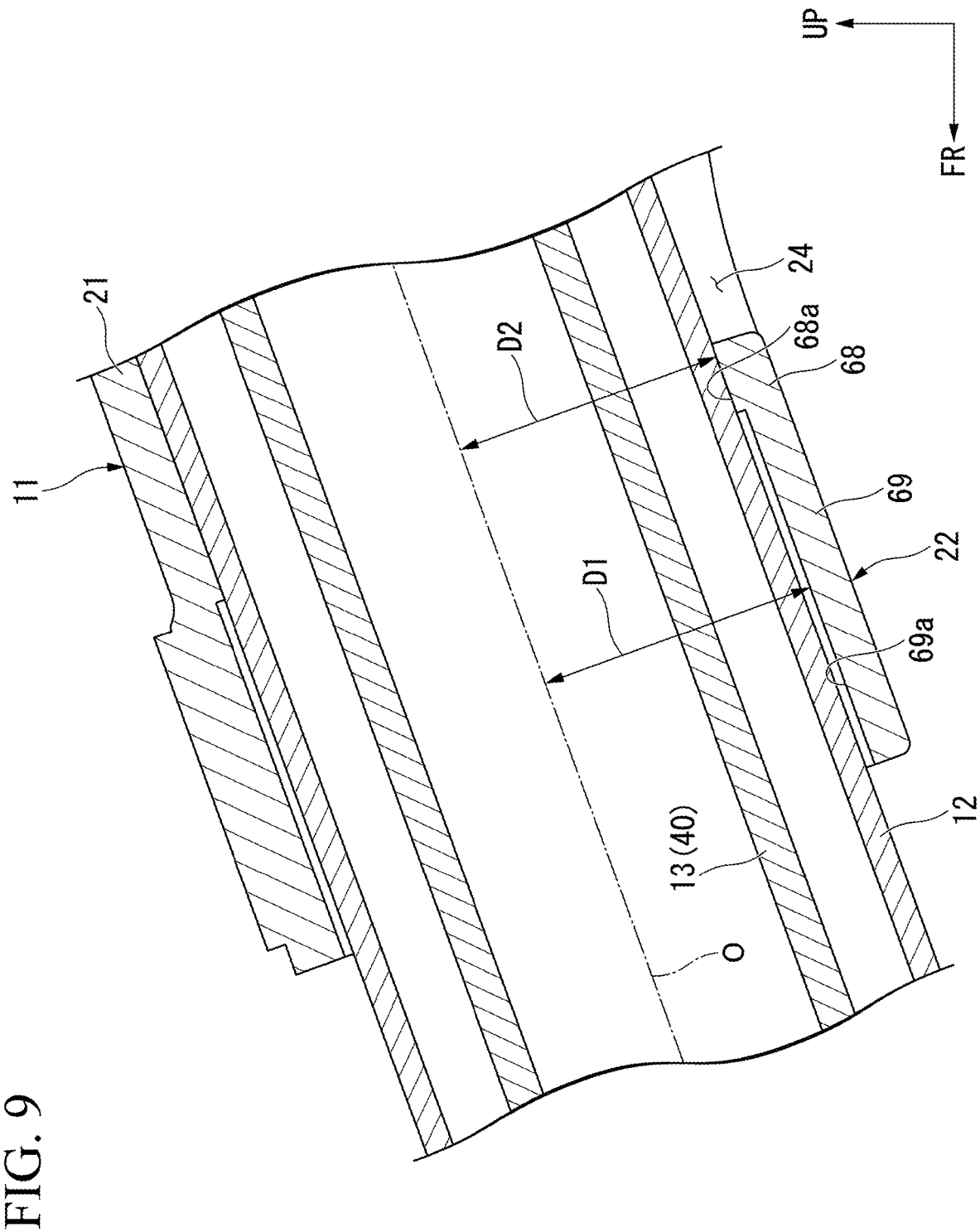
FIG. 9 is an enlarged cross-sectional view corresponding to a peripheral part of a guide cylinder portion.

FIG. 8 is a cross-sectional view taken along a line VIII-VIII of FIG. 2. FIG. 9 is an enlarged cross-sectional view perpendicular to axis O of the guide cylinder portion 22.

As shown in FIGS. 8 and 9, the guide cylinder portion 22 is formed in a multi-stage cylindrical shape in which an inner diameter of a part located at a front side in the axial direction is large. Specifically, the guide cylinder portion 22 includes a small diameter portion 68 which is located at a rear part of the guide cylinder portion 22 and a large diameter portion 69 which is connected to a front side of the small diameter portion 68. In the embodiment, the holding cylinder portion 21 and the guide cylinder portion 22 wrap the inner column 12 in an entire length in the axial direction regardless of a position of the inner column 12 in the axial direction. Additionally, the guide cylinder portion 22 may be formed in a multi-stage cylindrical shape having three stages or more of cylinders.

The small diameter portion 68 is formed in a circular (perfect circular) shape in a front view in the axial direction. In the embodiment, an inner diameter of the small diameter portion 68 is slightly larger than an outer diameter of the inner column 12. In the embodiment, an inner circumferential face of the small diameter portion 68 is formed as a support face 68a which slidably supports the outer circumferential face of the inner column 12.

The large diameter portion 69 is formed in a circular (perfect circular) shape in a front view from the axial direction. In the embodiment, an inner diameter of the large diameter portion 69 is larger than an inner diameter of the small diameter portion 68. The large diameter portion 69 is separated from the outer circumferential face of the inner column 12 in the radial direction during the telescopic adjustment. In contrast, an inner circumferential face of the large diameter portion 69 is formed as a regulation face 69a which contacts the outer circumferential face of the inner column 12 to regulate the movement of the inner column 12 in the radial direction when a collision load generated in the event of a secondary collision is input. That is, a distance D1 from the axis O to the regulation face 69a is longer than a distance D2 from the axis O to the support face 68a. Additionally, the inner diameter of the large diameter portion 69 may be set to an inner diameter in which the movement of the inner column 12 in the axial direction is allowed and the movement of the inner column 12 in the radial direction is regulated even when the inner column 12 is inclined in the radial direction.

In the embodiment, a length of the large diameter portion 69 in the axial direction is longer than a length of the small diameter portion 68 in the axial direction. Here, the lengths of the small diameter portion 68 and the large diameter portion 69 may be appropriately changed in consideration of a sliding resistance between the inner column 12 and the guide cylinder portion 22. Additionally, the support face 68a and the regulation face 69a may be smoothly connected to each other by tapering or the like.

As shown in FIG. 3, a bridge portion 70 is formed at a part between the slit 24 and the punched portion 29 in the axial direction at a lower part of the guide cylinder portion 22. The bridge portion 70 defines the slit 24 and the punched portion 29 and extends in the circumferential direction.

[Operation]

Next, an operation of the steering device 1 will be described. First, a telescopic operation (a longitudinal position adjustment) of the steering device 1 will be described.

In the following description, a state where the steering device 1 is locked is set as an initial state.

As shown in FIG. 2, in a case where a position of the steering wheel 2 in the longitudinal direction is adjusted, the operation lever 56 is first rotated so as to release the locking of the steering device 1. Specifically, when the operation lever 56 is rotated in a direction in which the thickness of the clamping cam 57 decreases (for example, downward), the clamping portions 26 move away from each other along with the side plate portions 51a and 51b so that the holding cylinder portion 21 increases in diameter. Accordingly, the clamping of the inner column 12 due to the holding cylinder portion 21 is released so that the locking of the steering device 1 is released.

When the steering wheel 2 is pushed in the axial direction in the lock released state, the steering wheel 2 moves forward along with the inner column 12 and the steering shaft 13. In contrast, when the steering wheel 2 is drawn out in the axial direction in the lock released state, the steering wheel 2 moves backward in the axial direction along with the inner column 12 and the steering shaft 13.

Next, the steering wheel 2 is adjusted to a desired position and then the operation lever 56 is rotated so that the steering device 1 is locked. Specifically, when the operation lever 56 is rotated in a direction in which the thickness of the clamping cam 57 increases (for example, upward), the clamping portions 26 move close to each other along with the side plate portions 51a and 51b so that the holding cylinder portion 21 decreases in diameter. Accordingly, the inner column 12 is clamped by the holding cylinder portion 21 so that the steering device 1 is locked.

As a result, the steering wheel 2 is fixed to a desired position in the longitudinal direction.

Next, an operation of the steering device 1 in the event of a secondary collision will be described.

For example, a forward collision load which is applied to the steering wheel 2 in the event of a secondary collision acts on a driver. When the collision load is equal to or larger than a predetermined value, the steering wheel 2 moves forward in the axial direction relative to the outer column 11 along with the inner column 12 or the steering shaft 13. Specifically, in the steering device 1, the inner column 12 slides on the inner circumferential face of the holding cylinder portion 21 or the support face 68a of the guide cylinder portion 22 to move forward in the axial direction relative to the outer column 11. Then, an impact load applied to a driver in the event of a secondary collision is reduced by a sliding resistance or the like between the outer column 11 and the inner column 12.

When the inner column 12 moves forward in the axial direction, the guide rail 54 moves forward in the axial direction relative to the rotation shaft 55 along with the inner column 12 and the rotation shaft 55 enters the load absorbing areas 63b and 64b from the telescopic areas 63a and 64a. As shown in FIG. 6, when the guide rail 54 moves forward relative to the rotation shaft 55 in the first guide hole 63, the protrusion piece 63c falls backward. In contrast, as shown in FIG. 7, when the guide rail 54 moves forward relative to the rotation shaft 55 in the load absorbing area 64b of the second guide hole 64, the load absorbing area 64b is pressed and widened. Accordingly, it is possible to further reduce an impact load generated in the event of a secondary collision.

Incidentally, as described above, since a component force of the collision load acts in the radial direction (the vertical direction) orthogonal to the axial direction when the collision load input direction intersects the axial direction of the inner column, there is a concern that twisting may occur.

In contrast, in the embodiment, the outer column 11 has a configuration in which the guide cylinder portion 22 having the support face 68a and the regulation face 69a is formed at the front side in the axial direction with respect to the slit 24.

According to this configuration, the inner column 12 moves in the axial direction relative to the outer column 11 while sliding on the support face 68a. For that reason, the inner column 12 can be smoothly guided relative to the outer column 11 when a telescopic operation is performed or a collision load is input.

Particularly, in the embodiment, the guide cylinder portion 22 has a configuration in which the regulation face 69a is provided at the front side of the support face 68a. For that reason, since a front part of the inner column 12 contacts the regulation face 69a when the inner column 12 is inclined in the radial direction (for example, upward) due to a collision load, the inclination of the inner column 12 in the radial direction is regulated. Accordingly, the above-described twisting can be suppressed. Thus, since the inner column 12 can be smoothly moved forward in the axial direction in the event of a secondary collision, a desired movement amount in the axial direction can be ensured in the event of a secondary collision. As a result, an impact absorption capacity in the event of a secondary collision can be further improved.

Further, in the embodiment, the distance D1 from the axis O to the regulation face 69a is longer than the distance D2 from the axis O to the support face 68a. For that reason, when the inner column 12 moves only in the axial direction relative to the outer column 11, the outer circumferential face of the inner column 12 does not contact the regulation face 69a. Accordingly, it is possible to inhibit an excessive sliding resistance between the outer circumferential face of the inner column 12 and the inner circumferential face of the guide cylinder portion 22.

Further, when an area ratio between the support face 68a and the regulation face 69a is changed, a sliding resistance between the outer column 11 and the inner column 12 can be changed. For example, when a contact area between the inner column 12 and the support face 68a is increased, a sliding resistance between the inner column 12 and the support face 68a increases. In this case, for example, a collision load absorbing amount can be increased.

In contrast, when a contact area between the inner column 12 and the support face 68a is decreased (the regulation face 69a is widened), a sliding resistance between the inner column 12 and the support face 68a decreases. In this case, for example, the collision load absorption amount can be reduced. In this way, the impact load absorption amount (sliding resistance) can be changed in accordance with a change in area ratio between the support face 68a and the regulation face 69a. Therefore, even when a required impact load absorption amount is different, it is possible to obtain a desired impact absorption capacity without significant design change. Further, it is possible to reduce the volume of the outer column 11 and to reduce the weight by reducing the contact area between the inner column 12 and the support face 68a.

In the embodiment, in the guide cylinder portion 22, an entire circumference of the inner circumferential face of the small diameter portion 68 forms the support face 68a and an entire circumference of the inner circumferential face of the large diameter portion 69 forms the regulation face 69a.

For that reason, since an entire circumference of the inner column 12 can be surrounded by the support face 68a and the regulation face 69a, the above-described twisting can be reliably suppressed.

In the embodiment, the punched portion 29 is formed at a part located at the opposite side to the slit 24 in the axial direction with the guide cylinder portion 22 interposed therebetween.

According to this configuration, the above-described twisting can be suppressed and the outer column 11 can be further decreased in weight.

Additionally, the technical scope of the present invention is not limited to the above-described embodiments and also includes various modifications of the above-described embodiments without departing from the spirit of the present invention.

For example, in the above-described embodiments, a configuration has been described in which the axis O intersects the longitudinal direction, but the present invention is not limited to this configuration. The axis O may match the longitudinal direction of the vehicle 3 or may be inclined in the horizontal direction.

In the above-described embodiments, a case has been described in which the guide portion is formed in a cylindrical shape including the support face 68a and the regulation face 69a, but the present invention is not limited to this configuration. That is, the support face and the regulation face may be intermittently disposed at an arbitrary position (for example, a portion which is easily twisted) in the circumferential direction.

Further, a part in the circumferential direction in the rear part of the guide cylinder portion 22 may form the support face 68a and the other face may be formed so that a distance in the axis O is longer than a distance from the axis O to the support face 68a. Additionally, a part in the circumferential direction in the front part of the guide cylinder portion 22 may form the regulation face 69a and the other face may be formed so that a distance of the axis O is shorter than a distance from the axis O to the regulation face 69a.

In the above-described embodiments, a configuration has been described in which the support face 68a and the regulation face 69a are connected to each other in the axial direction, but the present invention is not limited to this configuration. The support face 68a and the regulation face 69a may be separated from each other in the axial direction.

In the above-described embodiments, a configuration has been described in which the inner shape of the guide cylinder portion is entirely formed as a circular shape, but the present invention is not limited to this configuration. The inner shape of the guide cylinder portion may be formed as a rectangular shape or a triangular shape.

In the above-described embodiments, a case has been described in which the holding portion is the cylindrical holding cylinder portion 21, but the present invention is not limited to this configuration. The holding portion may hold the inner column 12 while the slit 24 is expanded and contracted.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A steering device comprising:
an inner member that extends along an axis and has a steering wheel attached to a first end side in an axial direction;
an outer member that includes a guide cylinder portion supporting the inner member to be movable in the axial direction, a holding cylinder portion located at the first end side in the axial direction in relation to the guide cylinder portion and having a slit extending in the axial direction, and a large diameter cylinder portion located at a second end side in the axial direction in relation to the guide cylinder portion; and
a telescopic adjustment mechanism configured to switch a locked state where a gap of the slit is contracted so that a movement of the inner member relative to the outer member is regulated by the holding cylinder portion and a lock released state where the gap of the slit is expanded so that the movement of the inner member relative to the outer member is allowed,
wherein a punched portion penetrating the outer member in a radial direction is formed so that a cutout is provided between the large diameter cylinder portion and the guide cylinder portion in the axial direction, with the large diameter portion located on one side of the punched portion and the guide cylinder portion located on an opposite side of the punched portion in the axial direction;
wherein the guide cylinder portion is formed between the slit and the punched portion in the axial direction,
wherein an inner circumferential face of the guide cylinder portion consists of a support face which covers and slidably supports an outer circumferential face of the inner member throughout a circumference direction and a regulation face which is located on the second end side in the axial direction in relation to the support face and covers the outer circumferential face of the inner member throughout the circumference direction, the guide cylinder portion being formed so that a distance from the axis to the regulation face in the radial direction is longer than a distance from the axis to the support face, and
wherein the support face and the regulation face are formed next to one another in the axial direction.

2. The steering device according to claim 1,
wherein a distance between the axis and an inner circumferential face of the large diameter cylinder portion in the radial direction is longer than the distance from the axis to the regulation face and is set to a length in which the outer circumferential face of the inner member does not contact the inner circumferential face of the large diameter cylinder portion in the circumference direction.

3. The steering device according to claim 1, wherein a bridge portion is formed between the slit and the punched portion in the axial direction on a lower part of the guide cylinder portion.

4. The steering device according to claim 3, wherein the bridge portion separates the slit and the punched portion and extends in the circumference direction.

* * * * *